United States Patent
Suzuki (10) Patent No.: US 7,383,110 B2
(45) Date of Patent: Jun. 3, 2008

(54) MOTOR CONTROL DEVICE AND ELECTRIC POWER STEERING DEVICE

(75) Inventor: Hiroshi Suzuki, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 312 days.

(21) Appl. No.: 11/156,577

(22) Filed: Jun. 21, 2005

(65) Prior Publication Data
US 2006/0009893 A1 Jan. 12, 2006

(30) Foreign Application Priority Data
Jun. 25, 2004 (JP) ............... 2004-187431

(51) Int. Cl.
*H02P 6/00* (2006.01)
(52) U.S. Cl. ............................. 701/41; 363/9
(58) Field of Classification Search .................. 701/41; 363/9; 318/716, 717, 718, 719, 720, 721, 318/722, 723, 724
See application file for complete search history.

(56) References Cited

U.S. PATENT DOCUMENTS

| | | | |
|---|---|---|---|
| 6,580,247 B2 * | 6/2003 | Nakazawa | 318/700 |
| 6,687,590 B2 * | 2/2004 | Kifuku et al. | 701/43 |
| 6,700,343 B2 * | 3/2004 | Masaki et al. | 318/434 |
| 6,838,844 B2 * | 1/2005 | Shimizu et al. | 318/287 |
| 7,136,733 B2 * | 11/2006 | Liu et al. | 701/43 |

FOREIGN PATENT DOCUMENTS

JP 2004-32848 1/2004

* cited by examiner

*Primary Examiner*—Dalena Tran
(74) *Attorney, Agent, or Firm*—Oblon, Spivak, McClelland, Maier & Neustadt, P.C.

(57) ABSTRACT

A motor control device is provided, wherein an electric power (P) consumed by the brushless DC motor is inferred from three parameters including motor phase currents (I) flowing through at least two phases of three phases of the brushless DC motor, motor phase voltages (V) applied to at least two phases which of the three phases, are the same in phase as the motor phase currents (I) flowing through the two phases, and a motor rotational angle (θ). Then, the value of a power supply current (Ib) supplied to the three-phase inverter is inferred based on the electric power (P) inferred to be consumed by the brushless DC motor and the power supply voltage (Vb) applied to a three-phase inverter. In accordance a flow chart shown in FIG. 3, the consumed electric power (P) is inferred by an expression (1) at step 337, the power supply current (Ib) is inferred by an expression (2) at step 338, and the inferred power supply current (Ib) is output to make it possible to detect the overcurrent supplied to the three-phase inverter.

4 Claims, 12 Drawing Sheets

MOTOR CONTROL DEVICE AND ELECTRIC POWER STEERING DEVICE

This application is based on and claims priority under 35 U.S.C. 119 with respect to Japanese Application No. 2004-187431 filed on Jun. 25, 2004.

BACKGROUND OF THE INVENTION

1. Field of the Invention

The present invention relates to a motor control device provided with a voltmeter which detects the power supply voltage applied to a three-phase inverter (or bridge circuit), for drivingly controlling a brushless DC motor (or DC motor) by the use of the three-phase inverter (or bridge circuit). In particular, it relates to means for inferring the value of an electric current supplied to the three-phase inverter (or bridge circuit). The present invention further relates to an electric power steering device incorporating the aforementioned motor control device.

2. Discussion of the Related Art

Figure 12:
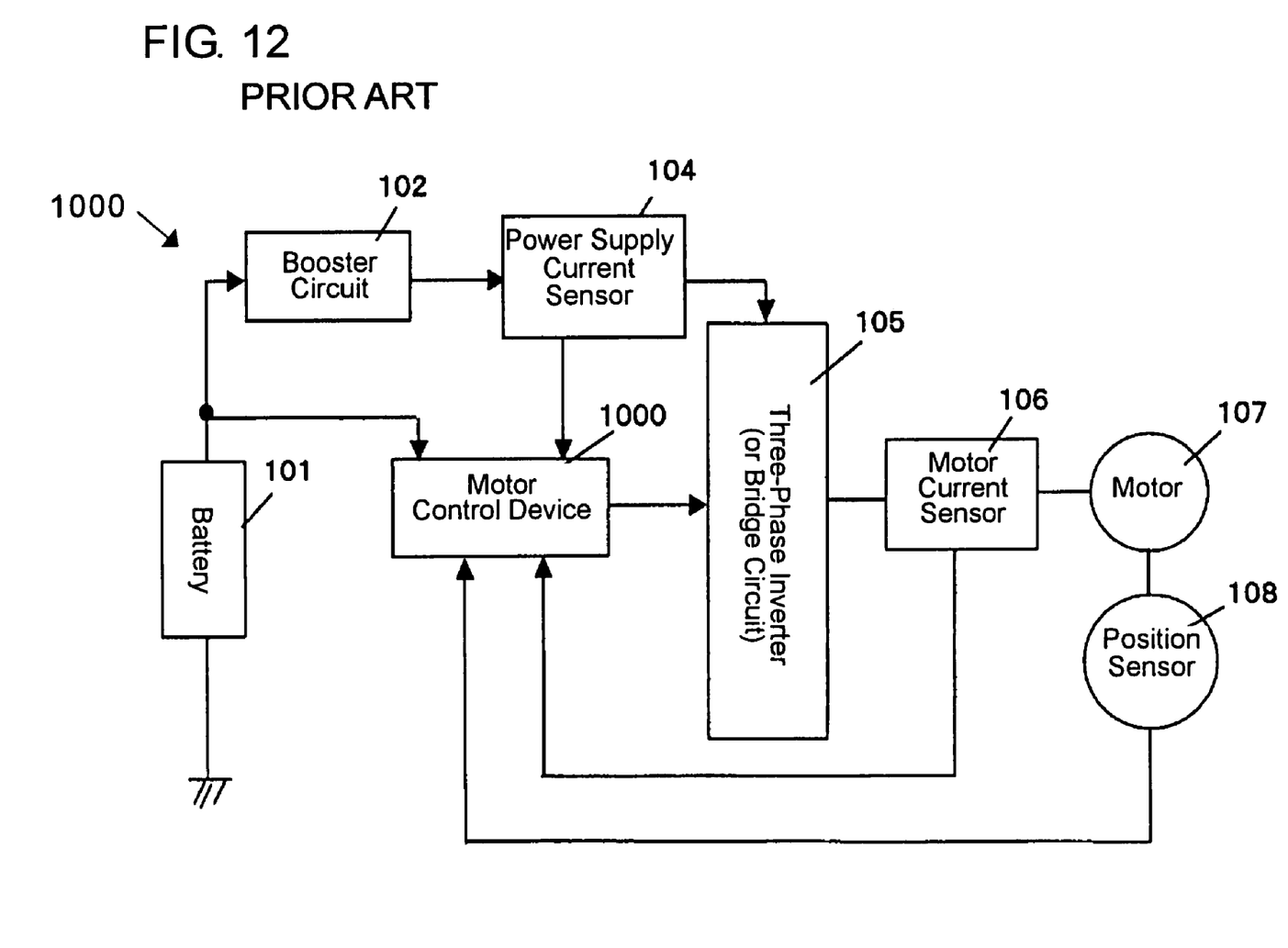
FIG. 12 is a block diagram showing the schematic system construction of a prior art motor control device 1000.

Heretofore, as shown in FIG. 12, there has been used a motor control device 1000 for drivingly controlling a brushless DC motor (or a DC motor) 107 by the use of a three-phase inverter (or a bridge circuit) 105. In the motor control device 1000, a battery 101, the three-phase inverter (or the bridge circuit) 105 and a power supply current sensor 104 which is provided on a connection line for connection therebetween have generally been used as means for detecting the overcurrent supplied to the three-phase inverter (or the bridge circuit) 105.

However, the prior art as described above necessitates the provision of the power supply current sensor 104 and is unavoidable to be increased in the cost therefor. Further, the omission of the power supply current sensor 104 results in failure to detect the amount of the electric current supplied to the three-phase inverter (or the bridge circuit) 105. This makes it unable to detect the state of overcurrent, whereby an appropriate countermeasure becomes difficult to take upon occurrence on an abnormality.

Japanese unexamined, published patent application No. 2004-32848 (patent document 1) has been proposed to solve the foregoing problems. In the patent document 1, since an expression (4) (described paragraph 0008) takes the assumptions of Id*=0 and Vd*=0, the effective value of the electric power P becomes smaller that an actual value, whereby it is unable to detect the current value accurately. In addition, although a motor as the object to be controlled is limited to brushless DC motors in the patent document 1, DC motors have been in wide use practically and thus, it has been required to derive a calculation method for the DC motors.

SUMMARY OF THE INVENTION

Accordingly, it is a primary object of the present invention to provide an improved motor control device which is capable of detecting the overcurrent of an electric current applied to a three-phase inverter (or a bridge circuit) for supplying an electric current to a brushless DC motor (or a DC motor) and which is inexpensive.

It is also an object of the present invention to provide an improved electric power steering device incorporating an improved motor control device of the character set forth above.

Briefly, according to the present invention, there is provided a motor control device having a voltmeter for measuring a power supply voltage (Vb) applied to a three-phase inverter and using the three-phase inverter for operating a brushless DC motor under three-phase drive control. The motor control device comprises electric power inference means for inferring an electric power (P) consumed by the brushless DC motor, from three parameters including (a) motor phase currents (I) flowing through at least two phases of three phases of the brushless DC motor, (b) motor phase voltages (V) applied to at least two phases which of the three phases, are the same in phase as the motor phase currents (I), and (c) a motor rotational angle (θ). The motor control device further comprises power supply current inference means for inferring the value of a power supply current (Ib) supplied to the three-phase inverter, based on both of the power supply voltage (Vb) and the electric power (P).

With this configuration, the electric power (P) consumed by the brushless DC motor is inferred from three parameters including the motor phase currents (I) flowing through at least two phases of the three phases of the brushless DC motor, the motor phase voltages (V) applied to at least two phases which of the three phases, are the same in phase as the motor phase currents (I), and the motor rotational angle (θ). Then, the value of a power supply current (Ib) supplied to the three-phase inverter is inferred based on the electric power (P) inferred to be consumed by the brushless DC motor and the power supply voltage (Vb) supplied to the three-phase inverter. Accordingly, by inferring the value of the power supply current (Ib) supplied to the three-phase inverter, it becomes unnecessary to provide an ammeter for directly detecting the power supply current supplied to the three-phase inverter. Thus, it can be realized to provide the motor control device which is capable of detecting the overcurrent state of the electric current supplied to the three-phase inverter and which is inexpensive.

According to the present invention, there is also provided with an electric power steering device for outputting an assist torque to assist the steering manipulation of a vehicle driver. The electric power steering device comprises the motor control device constructed as aforementioned, abnormality judgment means for making judgment of an abnormality by the use of the power supply current (Ib), and urgent control stop means for stopping the three-phase drive control performed by the motor control device for the brushless DC motor when the abnormality is detected by the abnormality judgment means.

With this construction, since the motor can be prevented from having an overcurrent applied thereto, it does not occur that an unexpected steering operation is performed in the electric power steering device. That is, in the electric power steering device constructed in this way, sufficient safety can be secured at an more inexpensive cost than that of the prior art.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

Hereafter, the embodiments according to the present invention will be described with reference to the accompanying drawings. The present invention is not limited to the following embodiments. Devices or parts which are the same as those shown in FIG. 12 are given the same reference numerals.

First Embodiment

Figure 1:
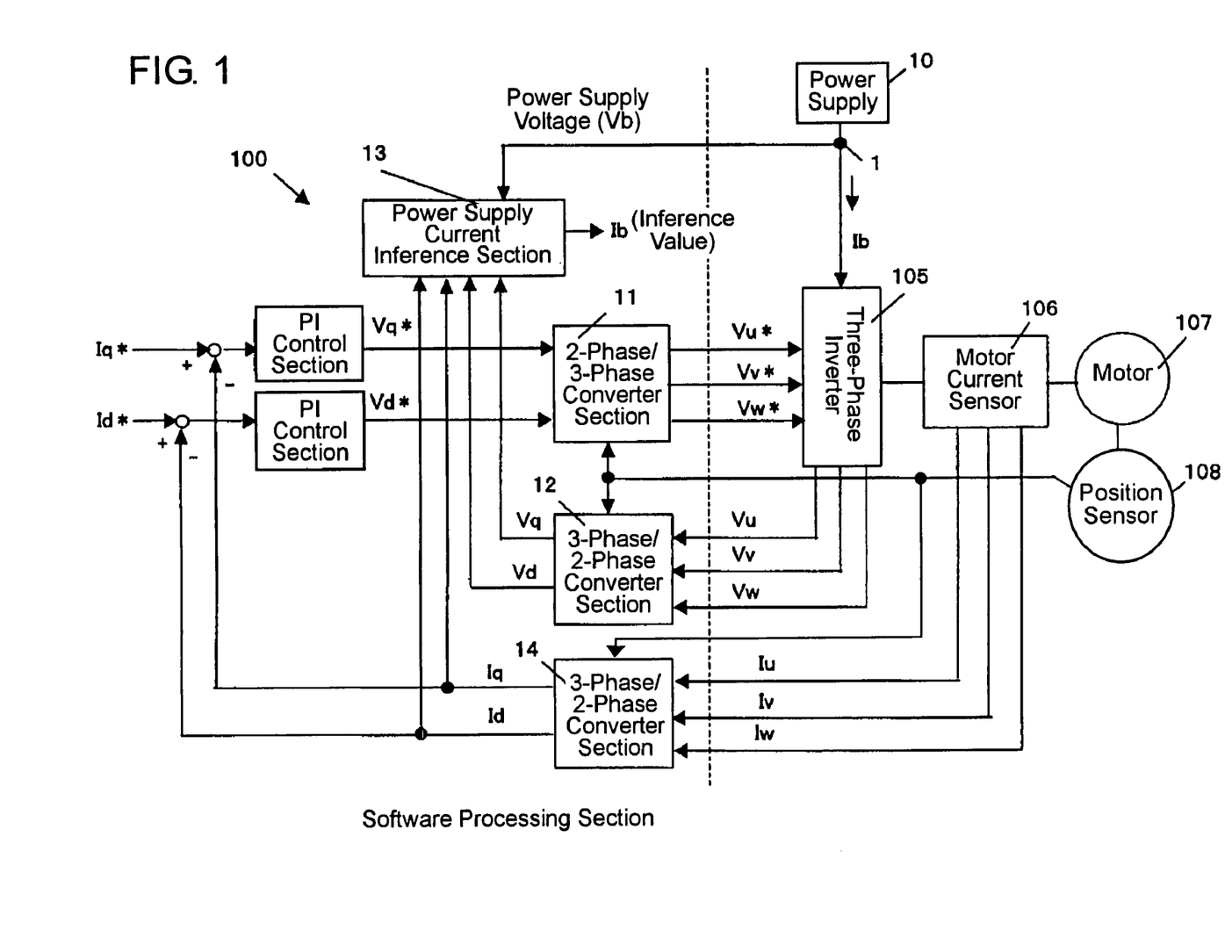
FIG. 1 is a block diagram showing the schematic system construction of a motor control device in a first embodiment according to the present invention.

FIG. 1 is a block diagram showing the schematic system construction of a motor control device 100 in the first embodiment according to the present invention. The motor control device 100 is provided with a computer (not shown) having a CPU, a ROM, a RAM and the like (all not shown). A three-phase inverter 105 is composed of a PWM (Pulse Width Modulation) converter, an FET (Field Effect Transistor) drive circuit and the like (all not shown) and converts a drive electric current into a sine wave through PWM control thereby to supply the electric power to a brushless DC motor 107. In FIG. 1, components provided at the left side of the broken line are constituted as a software processing section.

The three-phase inverter 105 is supplied with a power supply current (Ib) from a power supply 10 (which is represented as being composed of a battery 101 and a booster circuit 102 in FIG. 12, which are however represented collectively as power supply 10 in FIG. 1) through a voltmeter (voltage sensor) 1 for detecting a power supply voltage (Vb). The brushless DC motor 107 is supplied at its three phases of U, V and W with respective motor phase currents (Iu, Iv, Iw) from the three-phase inverter 105. A position sensor 108 provided integrally with the brushless DC motor 107 detects the rotational angle ($\theta$) of the brushless DC motor 107 on a real time basis to output the rotational angle ($\theta$) to the motor control device 100.

A well-known two-phase/three-phase converter section 11, a well-known three-phase/two-phase converter sections 12 and 14, a power supply current inference section 13 and the like are realized by a software for controlling the aforementioned computer (not shown). For example, the three-phase/two-phase converter section 14 calculates an Id-current and an Iq-current flowing respectively on a d-axis and a q-axis based on the rotational angle ($\theta$) detected by the position sensor 108 as well as on three-phase currents (Iu, Iv, Iw) detected by a motor current sensor 106. Further, the calculated Id-current and the calculated Iq-current are used to generate voltage command values (Vd* and Vq*) by being subjected to subtraction and PI (Proportional Integral) control together with current command values (Id* and Iq*) which are generated within the motor control device 100.

Furhter, the three-phase/two-phase converter section 12 calculates a Vd-voltage and a Vq-voltage respectively on the d-axis and the q-axis based on the rotational angle ($\theta$) detected by the position sensor 108 as well as on three-phase votages (Vu, Vv, Vw) detected by the three-phase inverter 105. And, the calculated Vd-voltage and Vq-voltage are input to the power supply current inference section 13. The two-phase/three-phase converter section 11 has input thereto the rotational angle ($\theta$) detected by the position sensor 108 and the voltage command values (Vq*, Vd*) and based on these inputs, outputs voltage command values (Vu*, Vv*, Vw*) for respective phases of the brushless DC motor 107 to the three-phase inverter 105.

Figure 2:
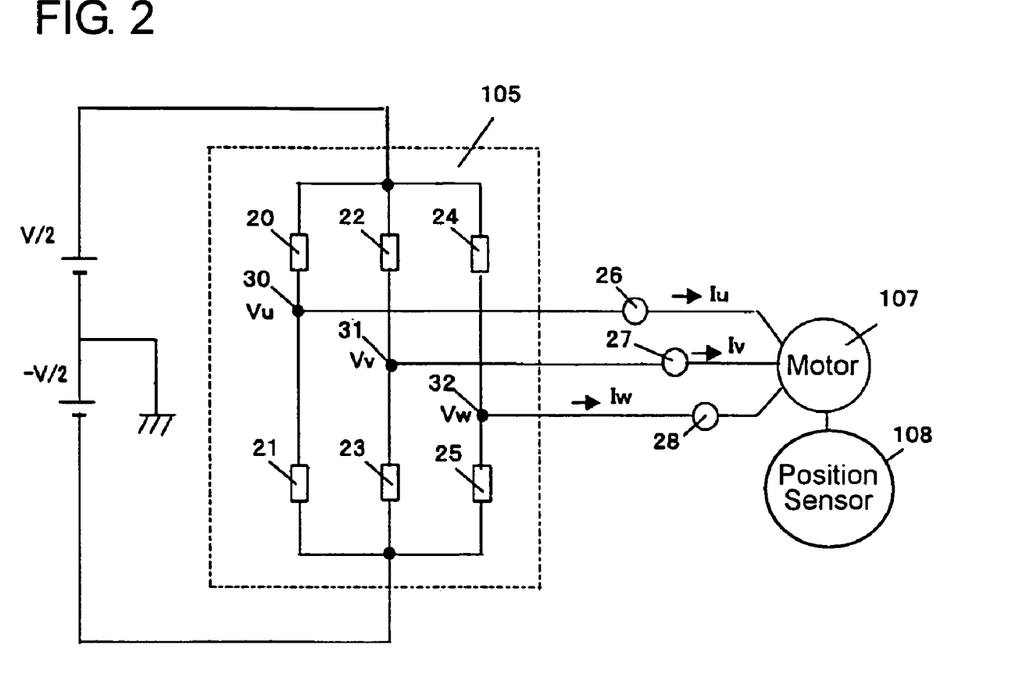
FIG. 2 is a circuit diagram showing the details of a three-phase inverter and a motor current sensor shown in FIG. 1 and FIG. 13.

FIG. 2 shows the details of the three-phase inverter 105 and the motor current sensor 106 shown in FIG. 1. The three-phase inverter 105 is composed of six FETs 20 to 25. Since these six FETs 20 to 25 are placed under the well-known PWM control, the operational principle therefor is omitted from being described. Further, the motor current sensor 106 is composed of three current sensors 26 to 28. Alternatively, two current sensors may be used where the influence of a current offset can be disregarded. A voltage (Vu) at a point 30 on the U-phase, a voltage (Vv) at a point 31 on the V-phase and a voltage (Vw) at a point 32 on the W-phase are detected for the phase voltages of the motor 107.

In this first embodiment, motor phase currents (I) flowing at least two phases of the three phases of the brushless DC motor 107 mean at least any two motor phase currents of the three-phase currents (Iu, Iv, Iw) which can be detected by the three current sensors 26 to 28 shown in FIG. 2. Also in this first embodiment, motor phase voltages (V) which are the same in phase as the motor phase currents (I) flowing the at least two phases of the three phases mean at least two motor phase voltages which, of the motor phase voltages (Vu, Vv, Vw) of the U-phase, the V-phase and the W-phase shown in FIG. 2, are the same in phase as the motor phase currents (I) of the at least two phases. Further, the motor rotational angle ($\theta$) means a rotational angle detected by the position sensor 108 shown in FIG. 2.

The operation of the power supply current inference section 13 which embodies a characterizing part of the present invention will be described hereinafter with reference to FIG. 3. The flow chart shown in FIG. 3 exemplifies a processing procedure which is executed at the power supply current inference section 13 of the motor control device 100.

The processing procedure executed at the power supply current inference section 13 is started first of all by inputting the power supply voltage (Vb) at step 331. The motor phase currents (Iu and Iv (or Iw)) of at least two phases of three phases are input at step 332. Also input at step 333 are the motor phase voltages (Vu and Vv (or Vw)) of at least two phases which of the three phases, are the same in phase as the motor phase currents (I) of the aforementioned two phases. In addition, the motor rotational angel (θ) is input at step 334.

At step 335, a d-axis current (Id) and a q-axis current (Iq) are calculated by performing the well-known three-phase/two-phase conversion of the respective values obtained at steps 332 to 334. At step 336, a d-axis voltage (Vd) and a q-axis voltage (Vq) are calculated by performing the well-known three-phase/two-phase conversion. An electric power (P) consumed by the brushless DC motor 107 is inferred by the use of the following expression (1) at step 337 (electric power inference means).

$$P = Vd \times Id + Vq \times Iq \qquad (1)$$

The value of a power supply current (Ib) supplied to the three-phase inverter is inferred by the following expression (2) using the power supply voltage (Vb) input at step 331 and the consumed electric power (P) calculated at step 337 (power supply current inference means).

$$Ib = P/Vb \qquad (2)$$

The power supply current (Ib) is output at step 339. The inference value of the power supply current (Ib) is calculated all the time in accordance with the aforementioned procedure, so that an abnormality such as overcurrent or the like can be detected effectively.

Second Embodiment

Although the foregoing first embodiment exemplifies the processing procedure which utilizes the foregoing expression (1) in calculating the electric power (P) consumed by the brushless DC motor 107, the second embodiment exemplifies another processing procedure for calculating the electric power (P) consumed by the brushless DC motor. This method corresponds to a second means according to the present invention.

Figure 13:
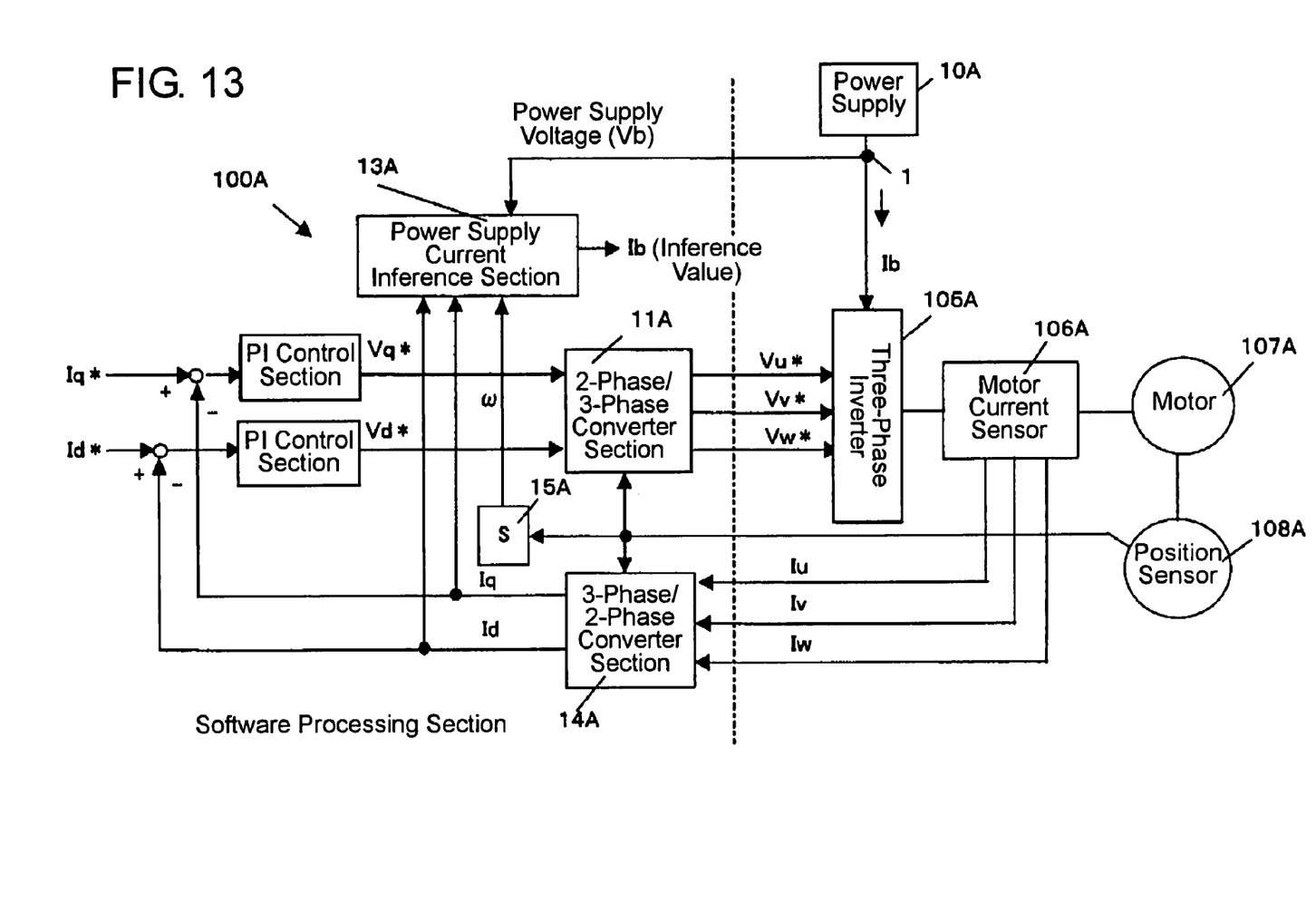
FIG. 13 is a block diagram showing the schematic system construction of the motor control device 100A in the second embodiment according to the present invention.

Like the first embodiment, the present second embodiment can take the same construction as that shown in FIG. 2. Since the difference from the first embodiment is only an arithmetic expression for the electric power (P) consumed by the brushless DC motor, the difference in inputs used in the arithmetic expression will be described with reference to FIG. 13. The first difference between the motor control device 100 shown in FIG. 1 and a motor control device 100A shown in FIG. 13 is that the three-phase voltage outputs (Vu, Vv, Vw) from the three-phase inverter 105 and the three-phase/two-phase converter 12 for converting the values into those of two phases are provided in the device 100 shown in FIG. 1, but not provided in the device 100A shown in FIG. 13. That is, the difference is that the second embodiment does not use the two-phase voltages (Vd and Vq) which are used at the power supply current inference section 13 in the first embodiment.

On the other hand, the second embodiment uses a motor rotational angular velocity (Ω) which is not used in the first embodiment. The motor rotational angular velocity (Ω) is obtained by differentiating, by a differentiating circuit 15A, the motor rotational angle (θ) detected from the position sensor 108A which is provided integrally with the brushless DC motor 107A. Otherwise than being obtained in this way, the motor rotational angular velocity (Ω) may of course be obtained by the use of a velocity sensor.

The operation of the power supply current inference section which embodies a characterizing part of the present invention will be described hereinafter with reference to FIG. 4. The flow chart shown in FIG. 4 exemplifies a processing procedure which is executed at the power supply current inference section 13A of the motor control device 100A shown in FIG. 13.

The processing procedure executed at the power supply current inference section 13A is started first of all by inputting the power supply voltage (Vb) at step 431. The motor phase currents (Iu and Iv (or Iw)) for at least two phases of the three phases are input at step 432. The motor rotational angel (θ) is input at step 433. At step 434, a motor rotational angular velocity (Ω) is obtained by performing the arithmetic processing (i.e., differentiation) of the motor rotational angel (θ) input at step 433.

At step 435, a d-axis current (Id) and a q-axis current (Iq) are calculated by performing the well-known three-phase/two-phase conversion. At step 436, a d-axis voltage (Vd) and a q-axis voltage (Vq) are calculated by the use of well-known equations (3) and (4) noted below.

$$Vd = R \times Id + L \times dId/dt - p \times \Omega L \times Iq \qquad 3)$$

$$Vq = p \times \Omega L \times Id + R \times Iq + L \times dIq/dt + Ke \times \Omega \qquad (4)$$

The meanings of the symbols used in the equations (3) and (4) are as follows:

All of the symbols are values pertaining to parts which constitute the brushless DC motor 107A. First of all, symbol "R" denotes a resistance value, symbol "L" denotes an inductance, symbol "p" denotes the number of pole pairs, and symbol "Ke" denotes a constant of the back electromotive force. The values of these parts have been measured in advance, and the measured values have been stored in a memory.

Further, at step 437, an electric power (P) consumed by the brushless DC motor is inferred by substituting the expressions (3) and (4) into the expression (1) (electric power inference means).

At step 438, the value of a power supply current (Ib) supplied to the three-phase converter 105A is inferred by the aforementioned expression (2) using the power supply voltage (Vb) input at step 431 and the consumed electric power (P) calculated at step 437 (power supply voltage inference means). The inference value of the power supply current (Ib) is calculated all the time in accordance with the aforementioned procedure, so that an abnormality such as overcurrent or the like can be detected effectively.

Third Embodiment

Although the foregoing first and second embodiments exemplify the processing procedures which respectively utilize the foregoing expressions (1), (2) and the foregoing expressions (3) and (4) in calculating the electric power (P) consumed by the brushless DC motors 107 and 107A, this third embodiment exemplifies another processing procedure for calculating the electric power (P) consumed by a DC motor. This method corresponds to a third means according to the present invention.

The large difference of the third embodiment from the foregoing first and second embodiments is that while the first and second embodiment utilize the three-phase inverter 105 or 105A in driving the brushless DC motor 107 or 107A, the third embodiment utilizes a bridge circuit (which is referred to as a "bridge circuit" in the present invention thought it is referred to as an "H-bridge circuit in some treatises). As described also in the first embodiment, since the three-phase inverter has three phases, the three-phase/two-phase converters 12 and 14 are used to convert the U, V and W phases of three phases into the d-axis and the q-axis of two phases. On the other hand, sine DC motors have only two phases, it is unnecessary to perform the three-phase/two-phase conversion. Further, in DC motors, the relation between a brush and a commutator both well known is represented as a d-axis and a q-axis in mechanical sense, and basically, the d-axis current is zero (Id=0). Hence, the current of DC motors means the q-axis current (Iq).

Figure 5:
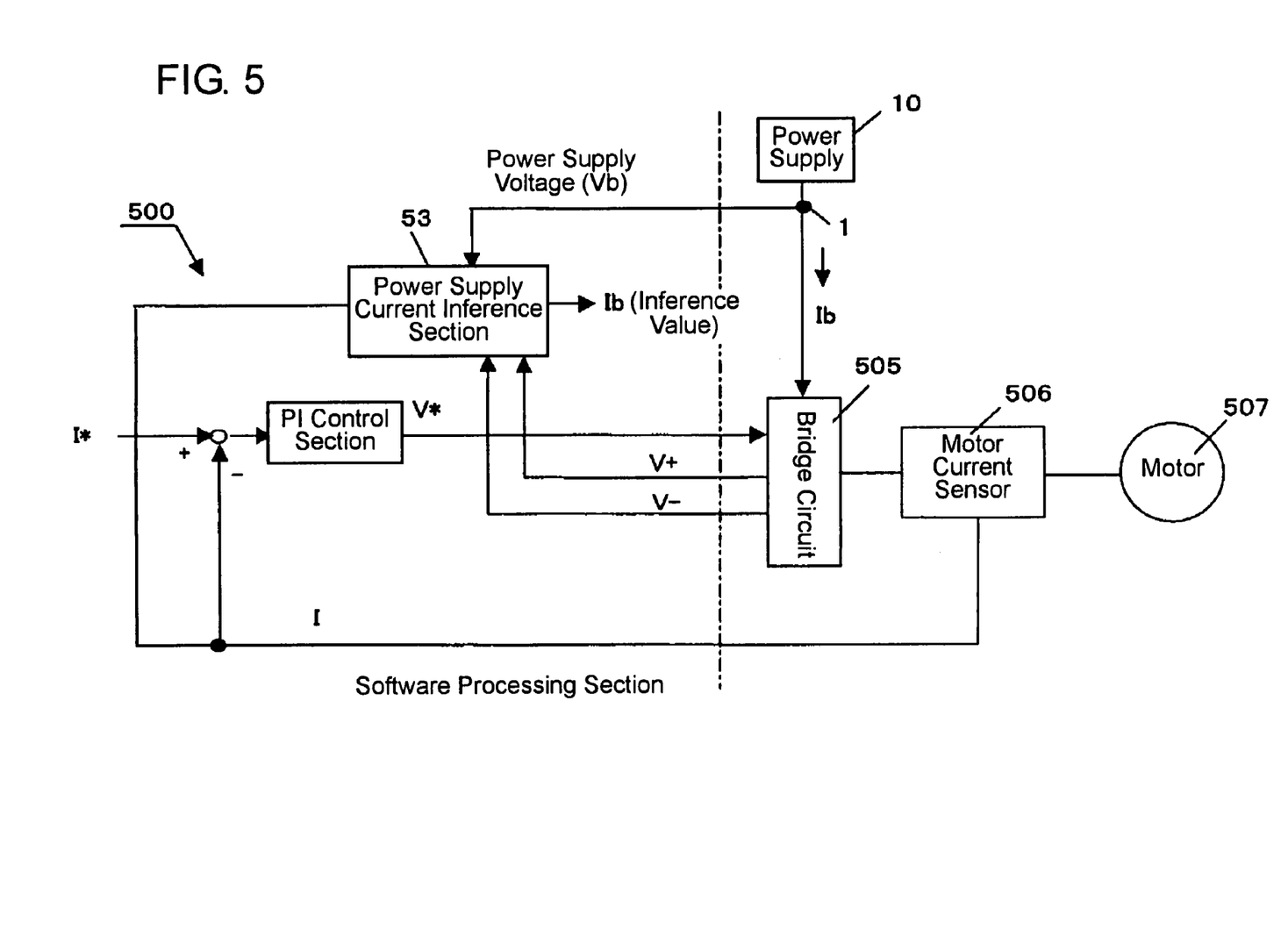
FIG. 5 is a block diagram showing the schematic system construction of a motor control device 500 in a third embodiment according to the present invention.

FIG. 5 is a block diagram showing the schematic system construction of a motor control device 500 in the third embodiment according to the present invention. Like the motor control device 100 shown in FIG. 1, the motor control device 500 is provided with a computer (not shown) having a CPU, a ROM, a RAM and the like (all not shown). A bridge circuit 505 is composed of a PWM converter, an FET drive circuit and the like (all not shown) and supplies a DC motor 507 with a drive voltage under PWM control to supply it with an electric power. In FIG. 5, components provided at the left side of the broken line are constituted as a software processing section.

The bridge circuit 505 is supplied with a power supply current (Ib) from a power supply 10 by way of a voltmeter (voltage sensor) 1 for measuring a power supply voltage (Vb).

The bridge circuit 505 is also supplied with a current (V*) which is calculated through a PI control section from the difference between a motor drive current (I) flown to the motor 507 and detected by a motor current sensor 506 and a current command value (I*) input from an upper component (not shown). The motor drive current (I) is flown from the bridge circuit 505 to the motor 507 to drive the same. Voltages V+ and V− are output from the bridge circuit 505 to be used in a power supply current inference section 53.

Figure 6:
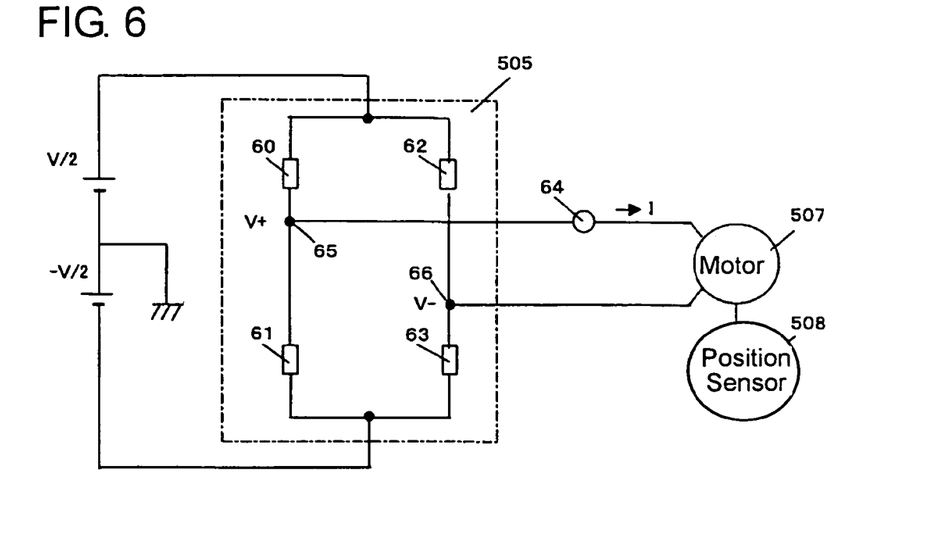
FIG. 6 is a circuit diagram showing the details of a bridge circuit and a motor current sensor shown in FIG. 5 and FIG. 14.

FIG. 6 shows the details of the bridge circuit 505 and the motor current sensor 506. The bridge circuit 505 is composed of four FETs 60 to 63. Since these four FETs 60 to 63 are placed under the well-known PWM control, the operational principle therefor is omitted from being described. The motor current sensor 506 is composed of one current sensor 64. Motor phase voltages V+ and V− are detected at points 65 and 66.

In this third embodiment and a fourth embodiment described later, the motor phase current (I) means a motor current which is detected by the single current sensor 64 shown in FIG. 6. And, the motor phase voltages (V) mean the motor voltages V+ and V− detected at the points 65 and 66 shown in FIG. 6.

The operation of the power supply current inference section 53 which embodies a characterizing part of the present invention will be described hereinafter with reference to FIG. 7. The flow chart shown in FIG. 7 exemplifies a processing procedure which is executed at the power supply current inference section 53 of the motor control device 500 shown in FIG. 5.

The processing procedure executed at the power supply current inference section 53 is started first of all by inputting the power supply voltage (Vb) at step 731. The motor current (I) is input at step 732. The motor voltages (V+ and V−) at the points 65 and 66 are input at step 733.

At step 734, an electric power (P) consumed by the DC motor 507 is inferred by the following expression (5) using the values obtained at steps 732 and 733 (electric power inference means).

$$P=(V+ - V-) \times I \qquad (5)$$

At step 735, the value of a power supply current (Ib) supplied to the bridge circuit 505 is inferred by the aforementioned expression (2) using the power supply voltage (Vb) input at step 731 and the consumed electric power (P) calculated at step 734 (power supply current inference means).

The power supply current (Ib) is output at step 736. The inference value of the power supply current (Ib) is calculated all the time in accordance with the aforementioned procedure, so that an abnormality such as overcurrent or the like can be detected effectively.

Fourth Embodiment

Although the foregoing third embodiment exemplifies the processing procedure which utilizes the foregoing expression (5) in calculating the electric power (P) consumed by the DC motor 507, the fourth embodiment exemplifies another processing procedure for calculating the electric power (P) consumed by the DC motor. This method corresponds to a fourth means according to the present invention.

Figure 14:
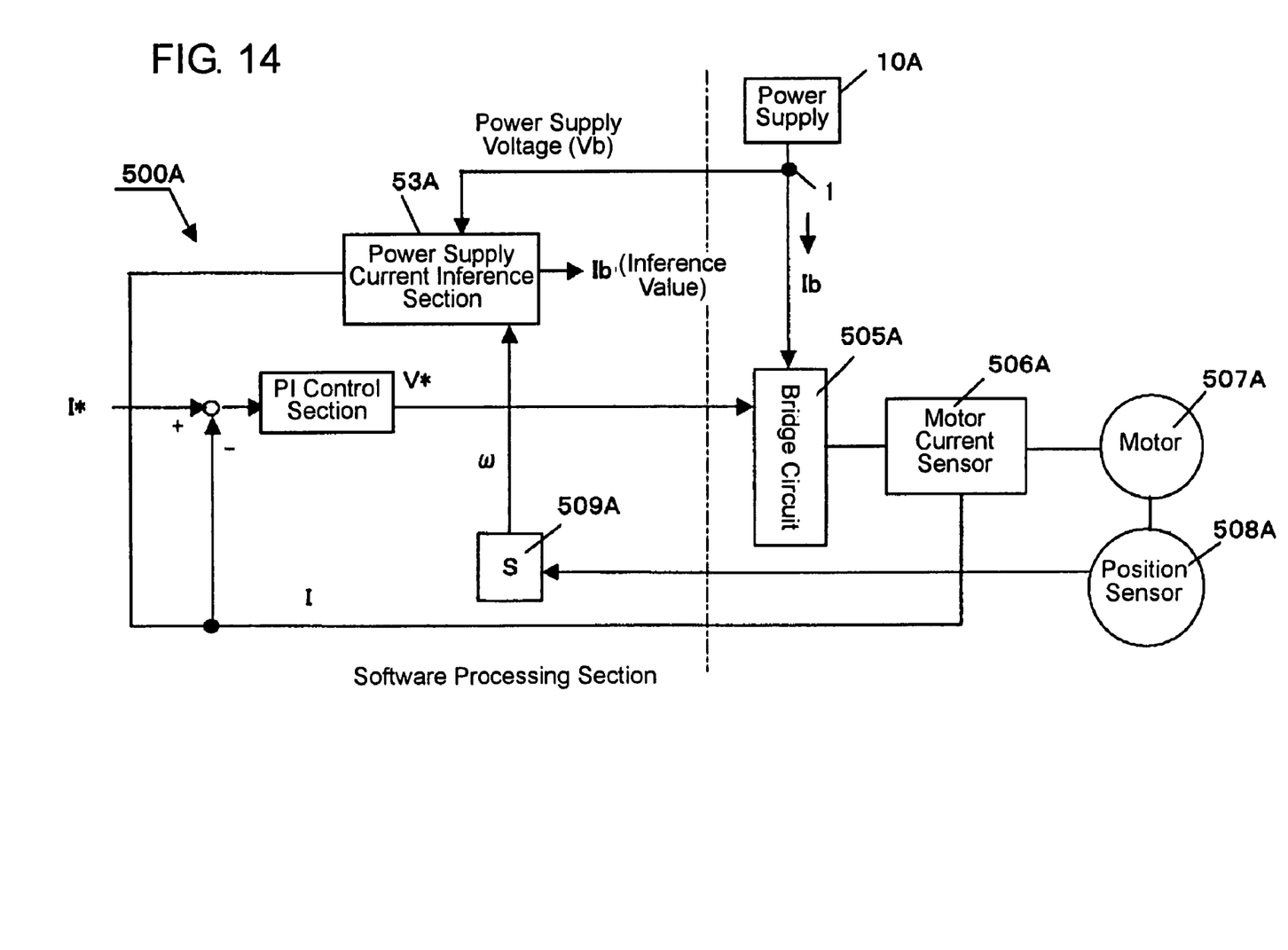
FIG. 14 is a block diagram showing the schematic system construction of the motor control device 500A in the fourth embodiment according to the present invention.

Like the third embodiment, the present fourth embodiment can take the same construction as that shown in FIG. 6. Since the difference from the third embodiment is only an arithmetic expression for the electric power (P) consumed by the DC motor, the difference in inputs used in the arithmetic expression will be described with reference to FIG. 14. The first difference between the motor control device 500 shown in FIG. 5 and a motor control device 500A shown in FIG. 14 is that the voltage outputs V+ and V− from the bridge circuit 505 shown in FIG. 5 are not input to a power supply current inference section 53A shown in FIG. 14. Instead, the fourth embodiment uses a motor rotational angular velocity (Ω) which is not used in the third embodiment. The motor rotational angular velocity (Ω) is obtained by differentiating, by a differentiating circuit 509A, the motor rotational angle (θ) detected from the position sensor 508A which is provided integrally with the DC motor 507A. Otherwise than being obtained in this way, the motor rotational angular velocity (Ω) may of course be obtained by the use of a velocity sensor.

The operation of the power supply current inference section 53A shown in FIG. 14 which embodies a characterizing part of the present invention will be described hereinafter with reference to FIG. 8. The flow chart shown in FIG. 8 exemplifies a processing procedure which is executed at the power supply current inference section 53A of the motor control device 500A.

The processing procedure executed at the power supply current inference section 53A is started first of all by inputting the power supply voltage (Vb) at step 831. The motor current (I) is input at step 832. The motor rotational angel (θ) is input at step 833. At step 834, the motor rotational angular velocity (Ω) is obtained by performing the arithmetic processing (i.e., differentiation) of the motor rotational angel (θ) input at step 833.

Figure 9:
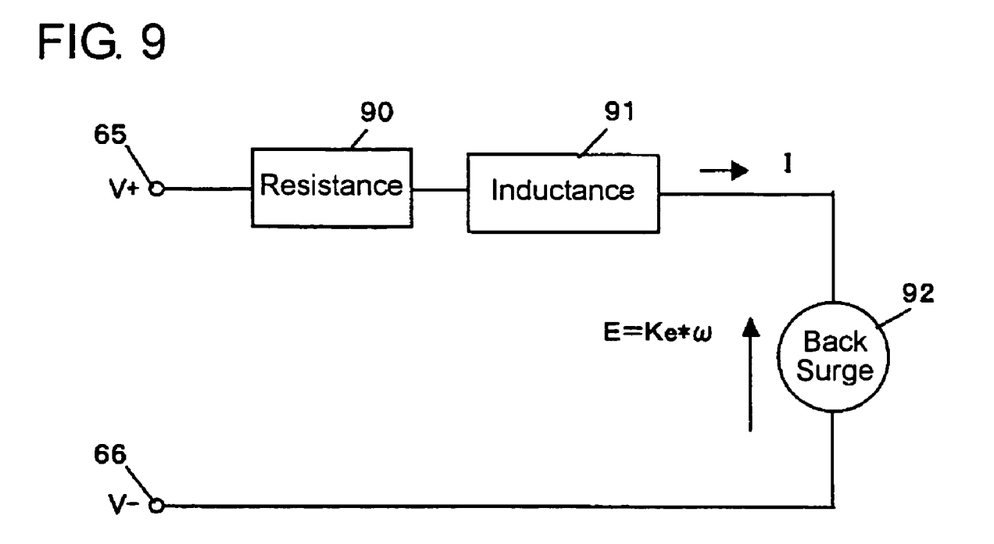
FIG. 9 is a block diagram of a DC motor 507 or 507A shown in FIG. 5 or FIG. 14.

At step 835, there is derived a motor voltage equation. The way of deriving the motor voltage equation will be described with reference to FIG. 9. FIG. 9 is a block diagram viewing the DC motor 507A from the points 65 and 66 with the motor voltages (V+ and V−) being applied thereon of the bridge circuit 505. Where symbols R, L and Ke are taken to respectively represent the winding resistance 90, the inductance 91 and a constant of the back electromotive force of the DC motor 507A, a back surge 92 is generated across the DC motor 507A in a direction of the arrow.

From FIG. 9, the motor voltage equation can be derived as a well-known expression (6) below.

$$V+-V-=R\times I+L\times dI/dt+Ke\times \Omega \quad (6)$$

The calculation of the motor voltage equation is made at step 835.

By substituting the equation (6) into the aforementioned expression (5), the following expression (7) is obtained from which the consumed electric power (P) of the DC motor 507A can be calculated.

$$P=R\times I\times I+L\times dI/dt\times I+Ke\times \Omega \times I \quad (7)$$

Thus, an electric power (P) consumed by the DC motor 507A is inferred from the expression (7) at step 836 (electric power inference means).

At step 837, the value of a power supply current (Ib) supplied to the bridge circuit 505A is inferred by the aforementioned expression (2) using the power supply voltage (Vb) input at step 831 and the consumed electric power (P) calculated at step 836 (power supply current inference means).

Further, the power supply current (Ib) is output at step 838.

The inference value of the power supply current (Ib) is calculated all the time in accordance with the aforementioned procedure, so that an abnormality such as overcurrent or the like can be detected effectively.

Fifth Embodiment

Figure 10:
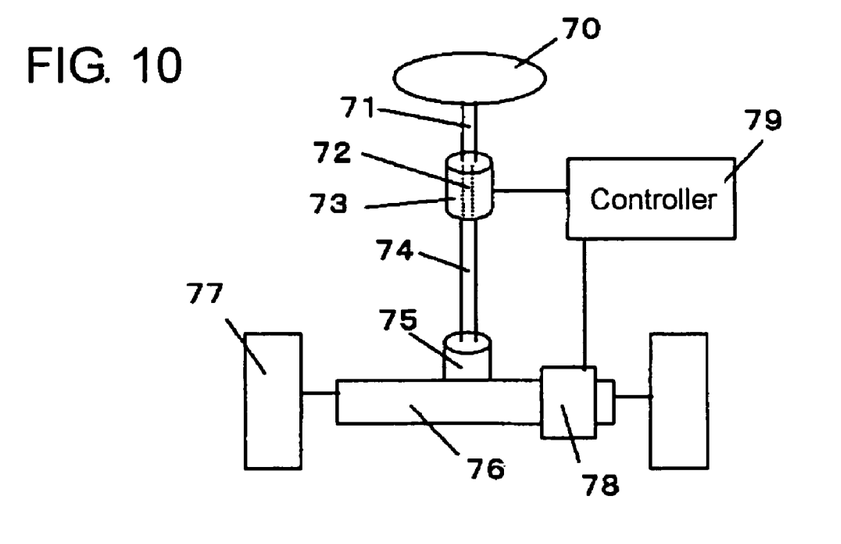
FIG. 10 is a schematic view of an electric power steering device in a fifth embodiment according to the present invention.

Hereinafter, an electric power steering device in one embodiment which embodies the present invention will be described with reference to FIGS. 10 and 11. FIG. 10 shows the schematic construction of the electric power steering device. A steering shaft 71 coupled to a steering wheel 70 is provided with a torsion bar 72, on which a torque sensor 73 is mounted. When a force is exerted on the torsion bar 72 upon rotation of the steering shaft 71, the torsion bar is twisted in dependence on the force exerted thereon, and the torque sensor 73 detects the torsion of the torsion bar 72.

The steering shaft 71 has a pinion shaft 74 secured thereto. A pinion 75 is secured to an extreme end of the pinion shaft 74 and is in meshing with a rack 76. The rack 76 and the pinion 75 constitute a rack and pinion mechanism. Opposite ends of the rack 76 respectively have secured thereto tie rods (not shown), whose outer ends are pivotably coupled respectively with knuckle arms (not shown).

Front wheels 77 as tires are mounted on the knuckle arms. An electric motor (hereafter as motor) 78 arranged coaxially with the rack 76 is constituted by a brushless DC motor. The motor 78 is controlled by a controller 79. The controller 79 is composed of the motor control device 100, the three-phase inverter 105, the motor current sensor 106 and the like which are shown in FIG. 1. Alternatively, the electric motor 78 may be a DC motor, and the controller 79 may be constructed to employ any of the foregoing motor control devices 100A, 500 and 500A and those associated therewith which are described in the foregoing second to fourth embodiments, instead of the motor control device 100 described in the first embodiment.

Next, with reference to FIG. 11, description will be made concerning a processing procedure for judging the occurrence of an abnormality from the power supply current (Ib) which is obtained by the motor control device described in either one of the foregoing first to fourth embodiments. The power supply current (Ib) is input at step 80. Then, a work RAM has input thereto an abnormality judging threshold value (Iabn) which is stored in a ROM provided inside of the motor control device 100, 100A, 500 or 500A. Then, at step 82, a comparison in magnitude is made between the abnormality judging threshold value (Iabn) and the power supply current (Ib) (abnormality judgment means).

When the abnormality judging threshold value (Iabn) is greater than the power supply current (Ib) (Yes at step 82), step 83 is reached to stop the control operation urgently (urgent control stop means). When the abnormality judging threshold value (Iabn) is less than the power supply current (Ib) (No at step 82), on the contrary, the routine is left without doing any processing.

While having been described with the brushless DC motor or the DC motor exemplified as an object to be controlled, the present invention is of course be applicable to induction motors and VR (Variable Reactance) motors in addition thereto.

Figure 3:
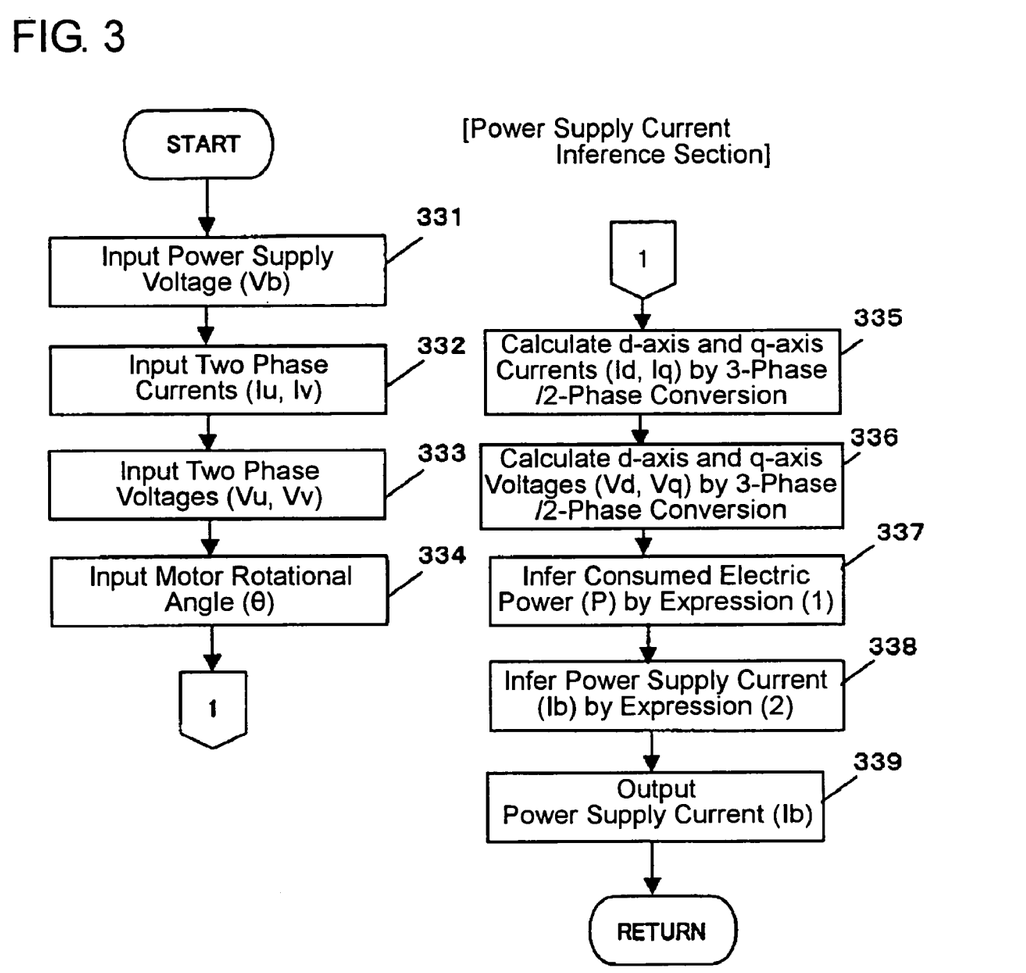
FIG. 3 is a flow chart exemplifying a processing procedure executed by a power supply current inference section 13 of the motor control device 100 in the first embodiment.

Finally, various features and many of the attendant advantages in the foregoing embodiments will be summarized as follows:

In the motor control device in the first embodiment typically shown in FIGS. 1 to 3, an electric power (P) consumed by the brushless DC motor 107 is inferred from three parameters including the motor phase currents (I) flowing through at least two phases of the three phases of the brushless DC motor 107, the motor phase voltages (V) applied to at least two phases which of the three phases, are the same in phase as the motor phase currents (I), and the motor rotational angle (θ) (step 337). Then, the value of a power supply current (Ib) supplied to the three-phase inverter 105 is inferred based on the electric power (P) inferred to be consumed by the brushless DC motor 107 and the power supply voltage (Vb) applied to the three-phase inverter 105 (step 338).

Figure 4:
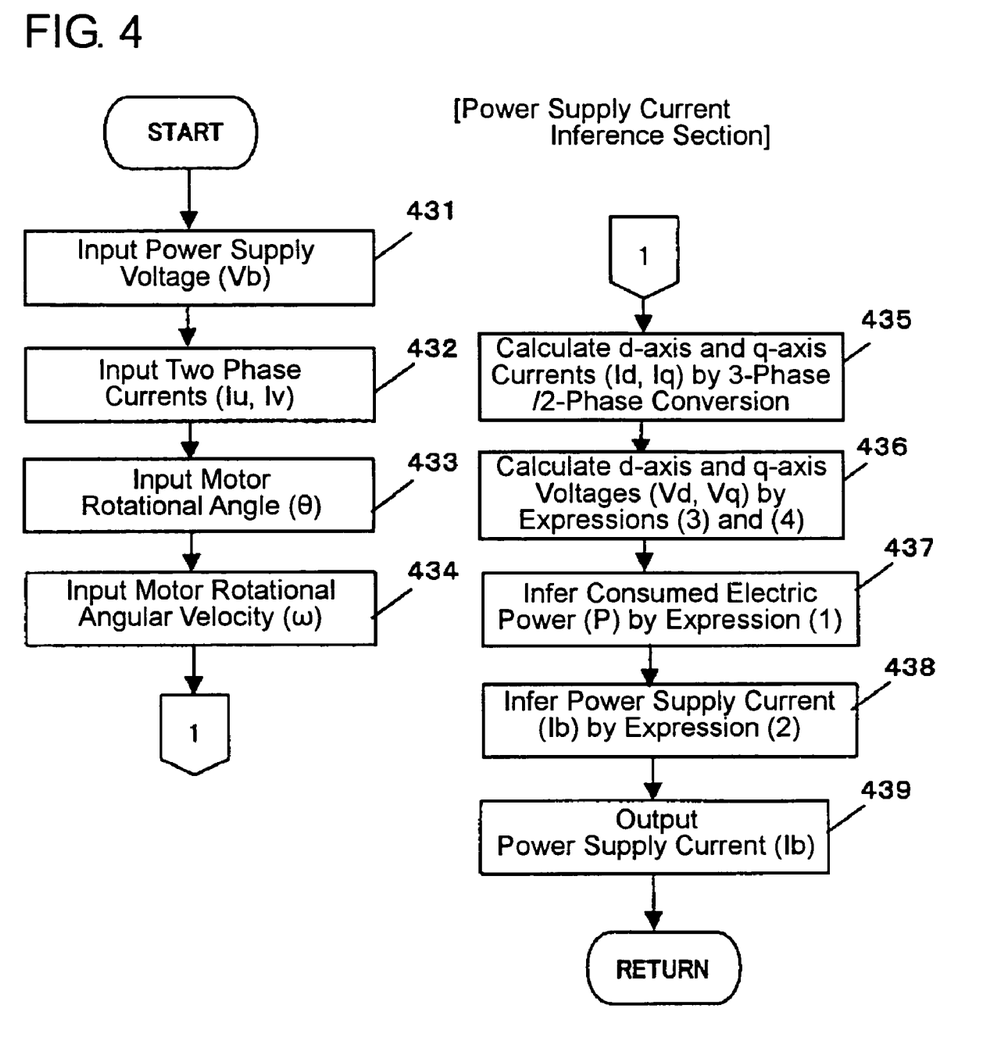
FIG. 4 is a flow chart exemplifying a processing procedure executed by a power supply current inference section 13A of a motor control device 100A in a second embodiment.

In the motor control device in the second embodiment typically shown in FIGS. 13 and 4, an electric power (P) consumed by the brushless DC motor 107A is inferred from the motor phase currents (I) flowing through at least two phases of the three phases of the brushless DC motor 107A and the motor rotational angular velocity (Ω) at step 437. Then, the value of a power supply current (Ib) supplied to the three-phase inverter 105A is inferred based on the electric power (P) inferred to be consumed by the brushless DC motor 107A and the power supply voltage (Vb) applied to the three-phase inverter 105A at step 438.

With the constructions in the first and second embodiments, by inferring the value of the power supply current (Ib) supplied to the three-phase inverter 105 or 105A, it becomes unnecessary to provide an ammeter for directly detecting the power supply current supplied to the three-phase inverter 105 or 105A. Thus, it can be realized to provide the motor control device 100 or 100A which is capable of detecting the overcurrent state of the electric current supplied to the three-phase inverter 105 or 105A and which is inexpensive.

Figure 7:
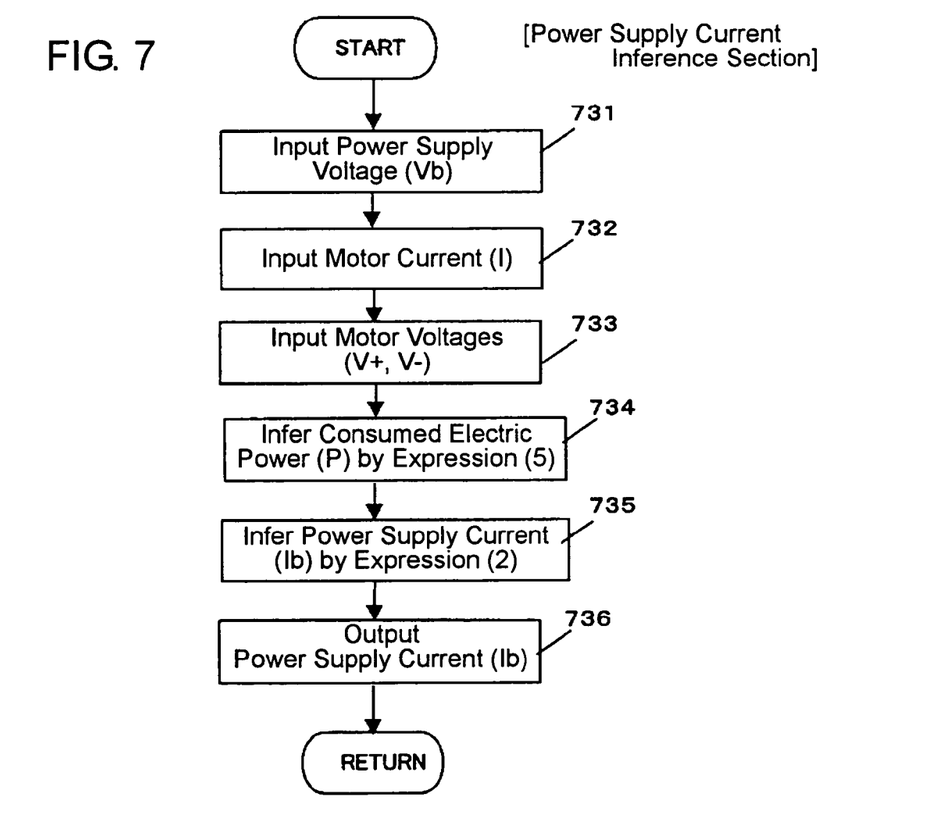
FIG. 7 is a flow chart exemplifying a processing procedure executed by a power supply current inference section 53 of the motor control device 500 in the third embodiment.

In the motor control device in the third embodiment typically shown in FIGS. 5 to 7, an electric power (P) consumed by the DC motor 507 is inferred from the motor current (I) and the motor voltages (V) of the DC motor 507 at step 734. Then, the value of a power supply current (Ib)

supplied to the bridge circuit 505 is inferred based on the electric power (P) inferred to be supplied by the DC motor 507 and the power supply voltage (Vb) applied to the bridge circuit 505 at step 735.

Figure 8:
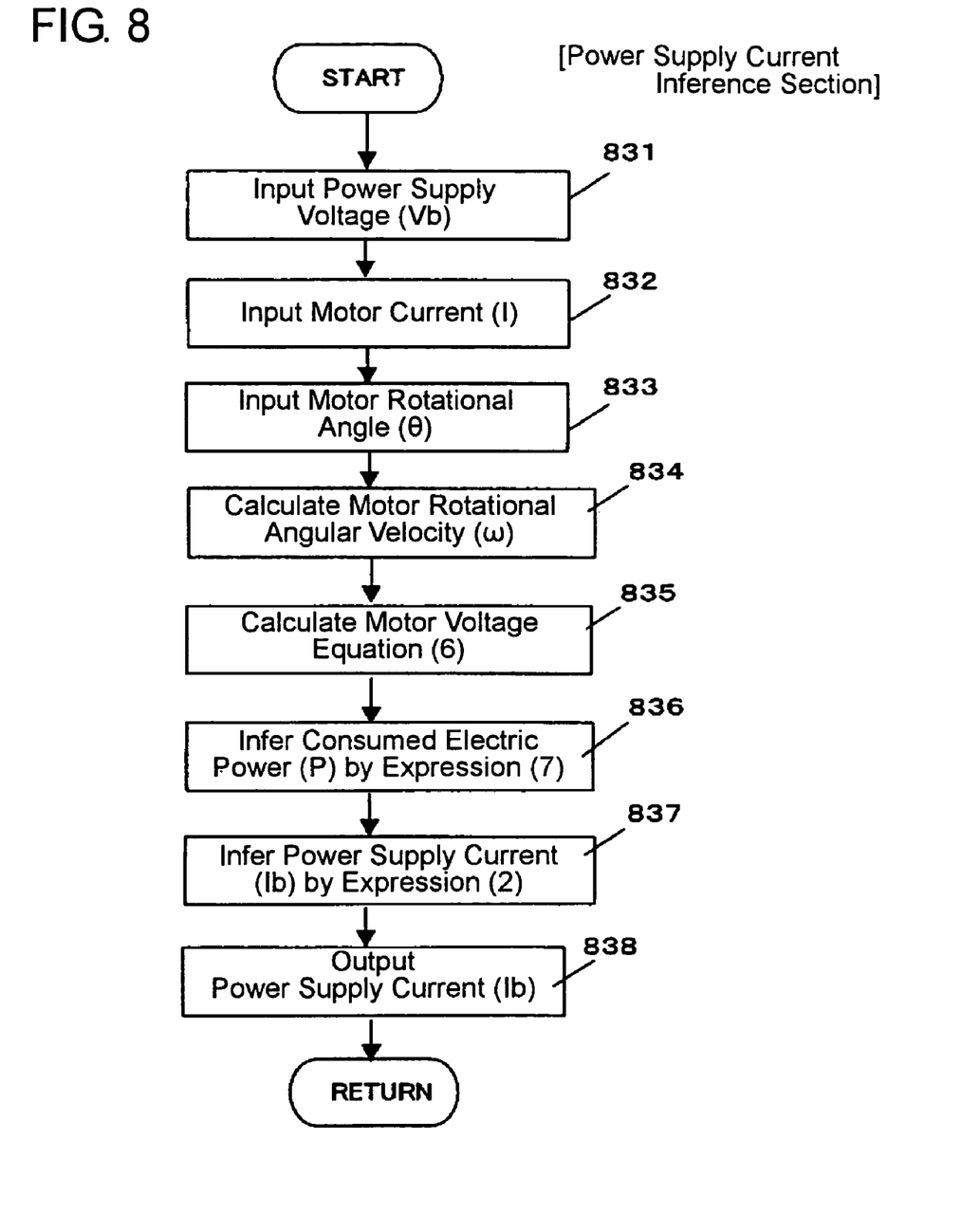
FIG. 8 is a flow chart exemplifying a processing procedure executed by a power supply current inference section 53A of a motor control device 500A in a fourth embodiment.

In the motor control device in the fourth embodiment typically shown in FIGS. 14 and 8, an electric power (P) consumed by the DC motor 507A is inferred from the motor current (I) and the motor rotational angular velocity (Ω) of the DC motor 507A at step 836. Then, the value of a power supply current (Ib) supplied to the bridge circuit 505A is inferred based on the electric power (P) inferred to be consumed by the DC motor 507A and the power supply voltage (Vb) applied to the bridge circuit 505A at step 837.

With the constructions in the third and fourth embodiments, by inferring the value of the power supply current (Ib) supplied to the bridge circuit 505 or 505A, it becomes unnecessary to provide an ammeter for directly detecting the power supply current supplied to the bridge circuit 505 or 505A. Thus, it can be realized to provide the motor control device 500 or 500A which is capable of detecting the overcurrent state of the electric current supplied to the bridge circuit 505 or 505A and which is inexpensive.

Figure 11:
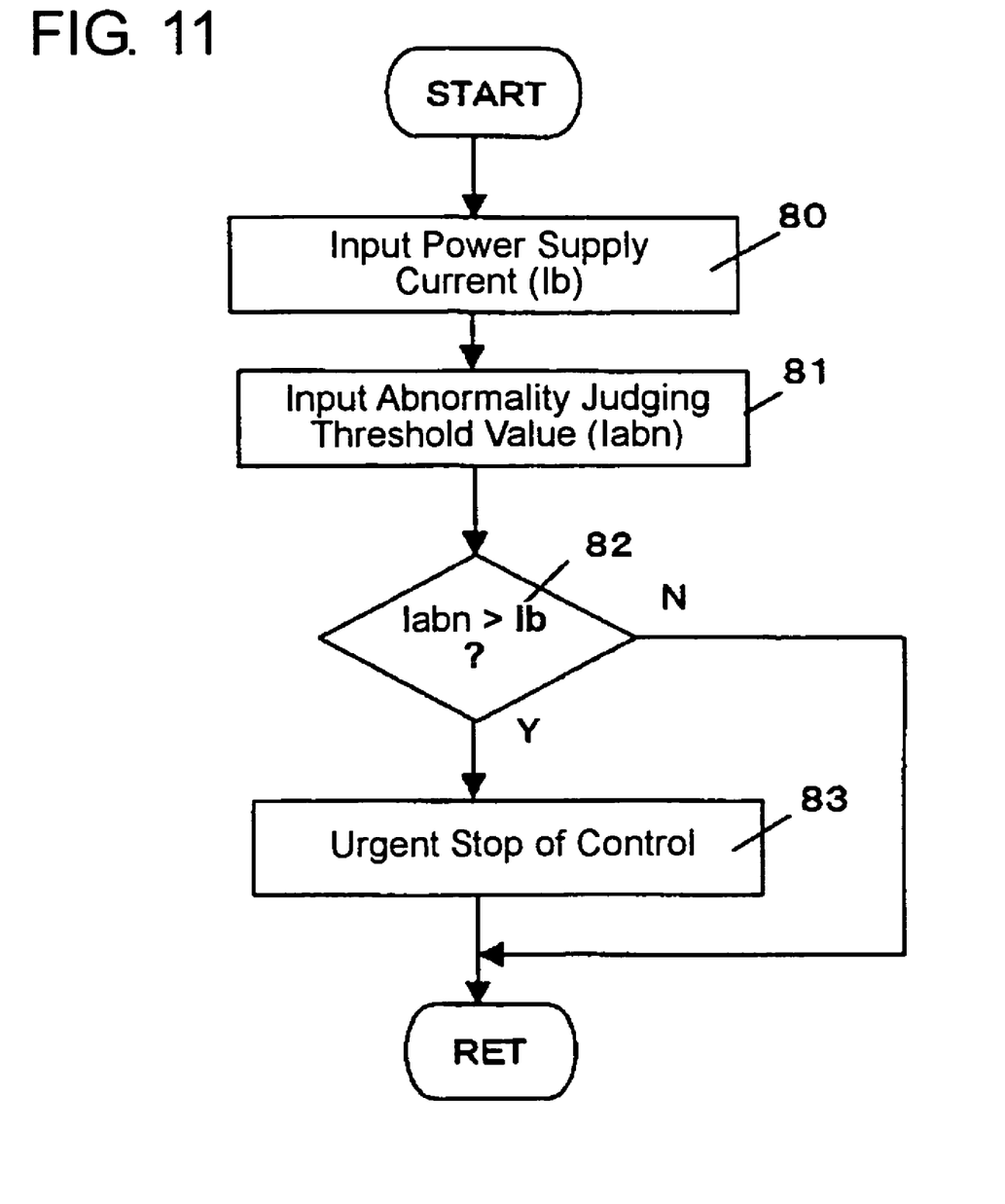
FIG. 11 is a flow chart exemplifying an abnormality detection routine executed by a controller of the electric power steering device in the fifth embodiment.

In the electric power steering device in the fifth embodiment typically shown in FIGS. 10 and 11, the motor control device 100 (100A, 500 or 500A) which is described in any of the foregoing first to fourth embodiments is utilized for inferring the power supply current (Ib) applied to the three-phase inverter 105 (105A) or the bridge circuit 505 (505A). The abnormality judgment is made at step 82 by the use of the inferred power supply current (Ib), and the drive control performed by the motor control device 100 (100A, 500 or 500A) for the motor 107 (107A, 507 or 507A) is stopped urgently at step 83 when the abnormality is detected.

With the construction in the fifth embodiment, since the motor 107 (107A, 507 or 507A) can be prevented from having an overcurrent applied thereto, it does not occur that an unexpected steering operation is performed in the electric power steering device. That is, in the electric power steering device constructed in this way, sufficient safety can be secured at a more inexpensive cost than that of the prior art.

Obviously, further numerous modifications and variations of the present invention are possible in light of the above teachings. It is therefore to be understood that within the scope of the appended claims, the present invention may be practiced otherwise than as specifically described herein.

What is claimed is:

1. A motor control device having a voltmeter for measuring a power supply voltage (Vb) applied to a three-phase inverter and using the three-phase inverter for operating a brushless DC motor under three-phase drive control, the motor control device comprising:

electric power inference means for inferring an electric power (P) consumed by the brushless DC motor, from three parameters including:

(a) motor phase currents (I) flowing through at least two phases of three phases of the brushless DC motor, (b) motor phase voltages (V) applied to at least two phases which of the three phases, are the same in phase as the motor phase currents (I) flowing through the two phases, and (c) a motor rotational angle (θ); and power supply current inference means for inferring the value of a power supply current (Ib) supplied to the three-phase inverter, based on both of the power supply voltage (Vb) and the electric power (P).

2. A motor control device having a voltmeter for measuring a power supply voltage (Vb) applied to a three-phase inverter and using the three-phase inverter for operating a brushless DC motor under three-phase drive control, the motor control device comprising:

electric power inference means for inferring an electric power (P) consumed by the brushless DC motor, from both of parameters including motor phase currents (I) flowing through at least two phases of three phases of the brushless DC motor and a motor rotational angular velocity (ω); and power supply current inference means for inferring the value of a power supply current (Ib) supplied to the three-phase inverter, based on both of the power supply voltage (Vb) and the electric power (P).

3. An electric power steering device for outputting an assist torque to assist the steering manipulation of a vehicle driver, comprising:

the motor control device as set forth in claim 1;

abnormality judgment means for making judgment of an abnormality when a threshold value exceeds the power supply current (Ib); and urgent control stop means for stopping the three-phase drive control performed by the motor control device for the brushless DC motor when the abnormality is detected by the abnormality judgment means.

4. An electric power steering device for outputting an assist torque to assist the steering manipulation of a vehicle driver, comprising:

the motor control device as set forth in claim 2;

abnormality judgment means for making judgment of an abnormality when a threshold value exceeds the power supply current (Ib); and urgent control stop means for stopping the three-phase drive control performed by the motor control device for the brushless DC motor when the abnormality is detected by the abnormality judgment means.

* * * * *